US012272347B2

(12) United States Patent
Feigin-Almon

(10) Patent No.: US 12,272,347 B2
(45) Date of Patent: Apr. 8, 2025

(54) HELICAL ACOUSTIC LENS

(71) Applicant: Moshe Benezra, Elmsford, NY (US)

(72) Inventor: Micha Feigin-Almon, Natick, MA (US)

( * ) Notice: Subject to any disclaimer, the term of this patent is extended or adjusted under 35 U.S.C. 154(b) by 436 days.

(21) Appl. No.: 17/509,045

(22) Filed: Oct. 24, 2021

(65) Prior Publication Data

US 2022/0130368 A1 Apr. 28, 2022

Related U.S. Application Data

(60) Provisional application No. 63/105,351, filed on Oct. 25, 2020.

(51) Int. Cl.
*G10K 11/30* (2006.01)
*G10K 11/02* (2006.01)

(52) U.S. Cl.
CPC ............ *G10K 11/30* (2013.01); *G10K 11/025* (2013.01)

(58) Field of Classification Search
CPC ...... G10K 11/30; G10K 11/025; G10K 11/26; G10K 11/18; G10K 11/02
See application file for complete search history.

(56) References Cited

U.S. PATENT DOCUMENTS

| | | | | |
|---|---|---|---|---|
| 3,903,990 A * | 9/1975 | Tannaka | G10K 11/30 | 367/150 |
| 6,313,802 B1 * | 11/2001 | Petersson | H01Q 15/04 | 343/753 |
| 10,873,812 B2 * | 12/2020 | Subramanian | H04R 3/12 | |
| 11,228,838 B2 * | 1/2022 | Subramanian | G01N 29/221 | |
| 2008/0128199 A1 * | 6/2008 | Magalotti | G10K 11/26 | 181/185 |
| 2022/0180853 A1 * | 6/2022 | Memoli | G10K 11/04 | |

FOREIGN PATENT DOCUMENTS

| | | | |
|---|---|---|---|
| CN | 107492370 A * | 12/2017 | G10K 11/30 |
| CN | 108281135 A * | 7/2018 | G10K 11/26 |
| KR | 102423841 B1 * | 7/2022 | G10K 11/30 |
| WO | WO-9411920 A1 * | 5/1994 | H01Q 15/04 |

* cited by examiner

*Primary Examiner* — Edgardo San Martin

(57) ABSTRACT

A meta-material acoustic lens is based on multiple acoustic channels, having a helix shaped path arranged radially around the center. The helix pitch is a function of the helix radius. This changes the effective thickness of the lens as a function of its distance from the center of the lens. This create a phase shift gradient across the lens, which in turn changes the wavefront from one side of the lens to the other. This results with either a focusing lens, when the effective thickness decreases from center to edge of the lens, or a diverging lens when the effecting thickness decreases from center to edge of the lens.

5 Claims, 6 Drawing Sheets

201 202 203

Image of a 3D lens — Rendering of a lens model — Rendering of a single helical layer Lens

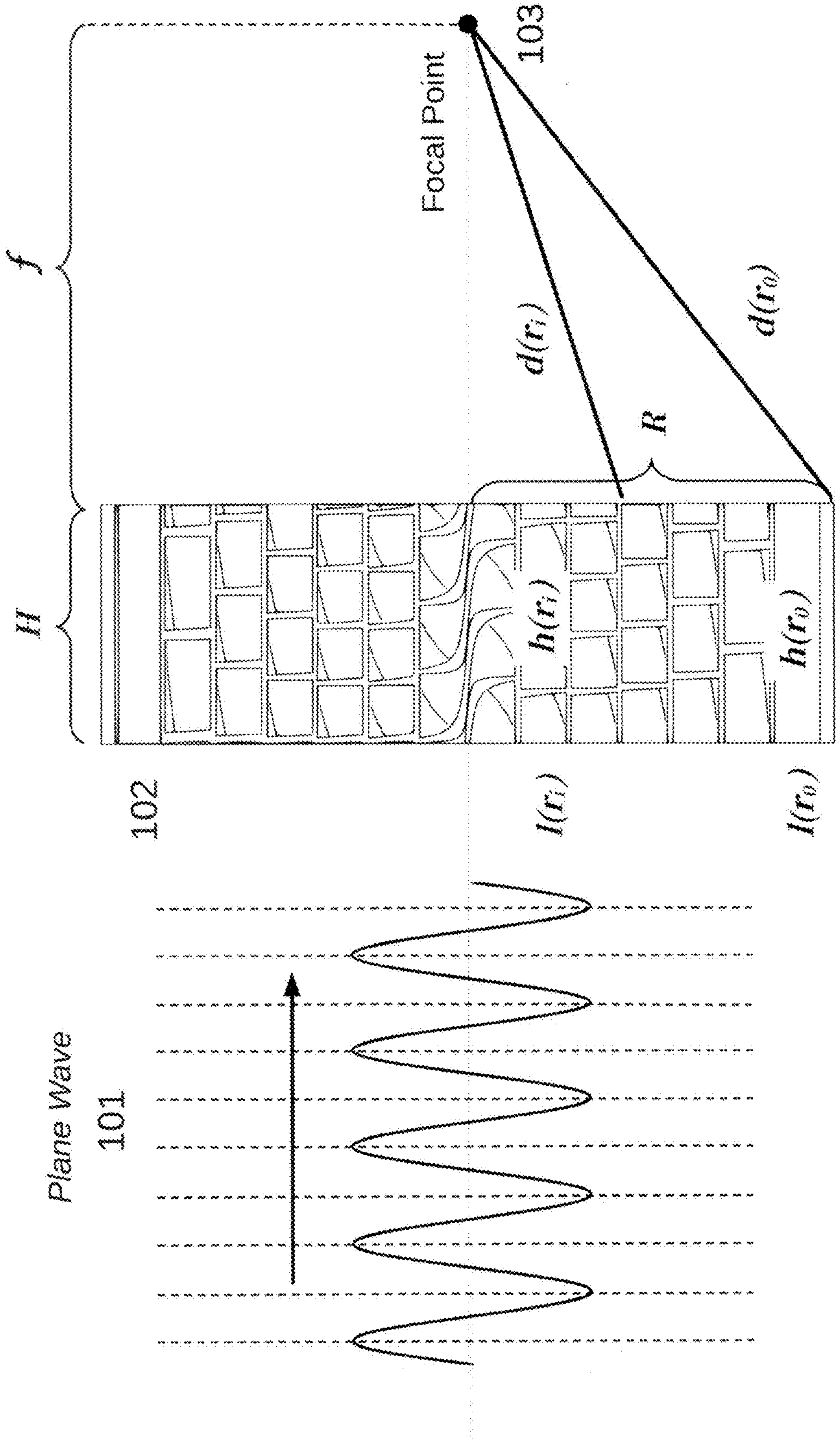
*FIG* 1. Notations

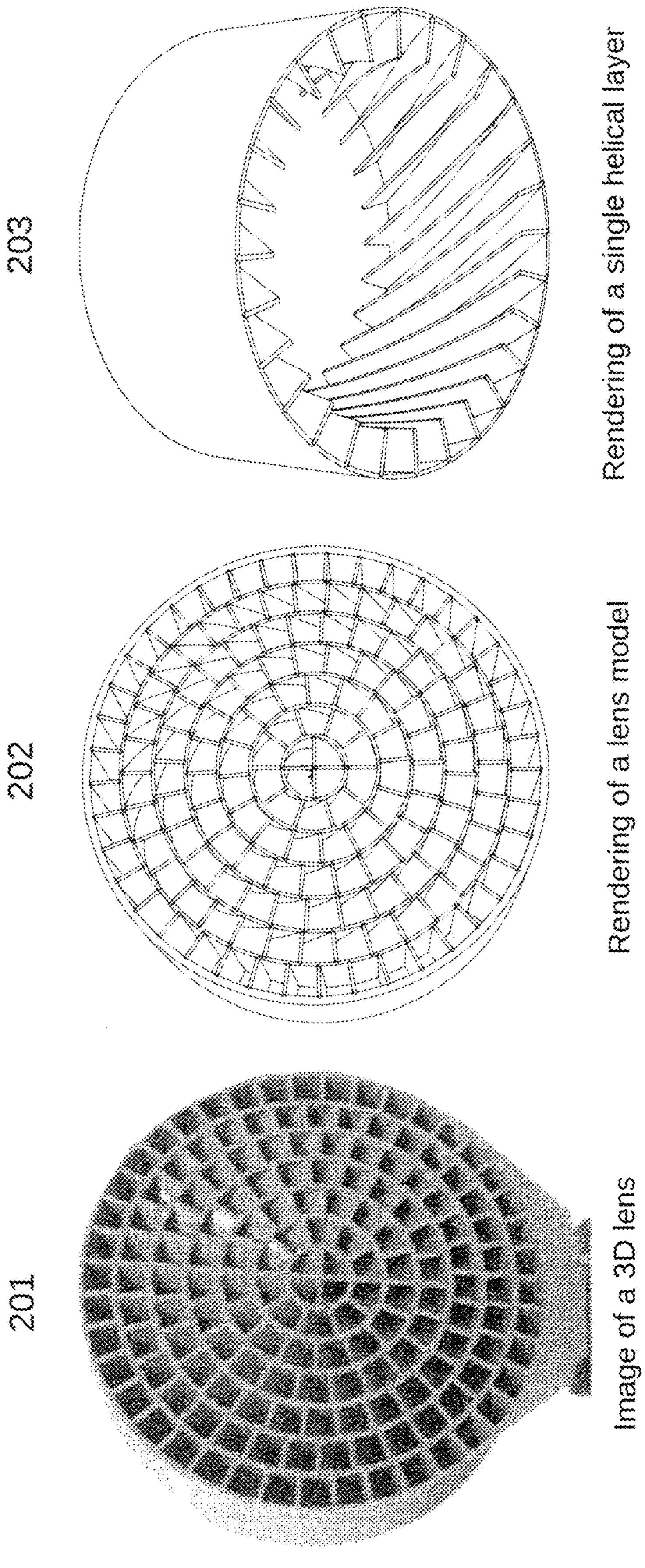
*FIG 2.* Lens

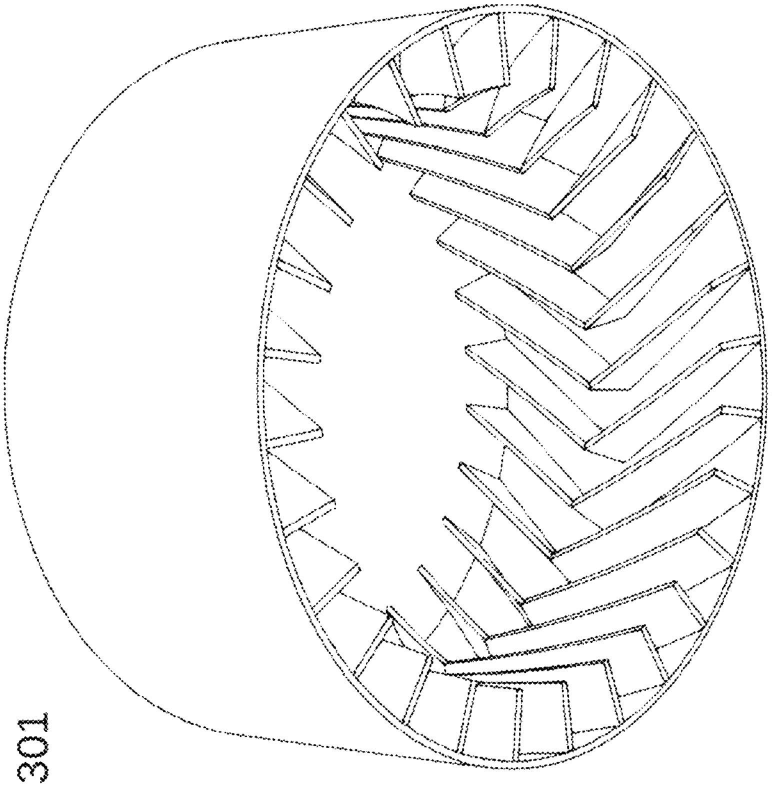
*FIG 3.* Mirrored Lens

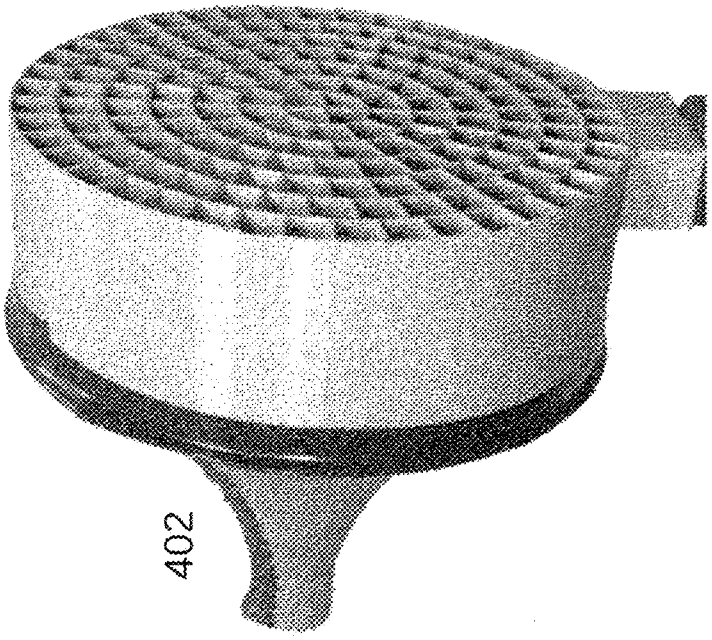
Image of a helical lens matched to an exponential horn
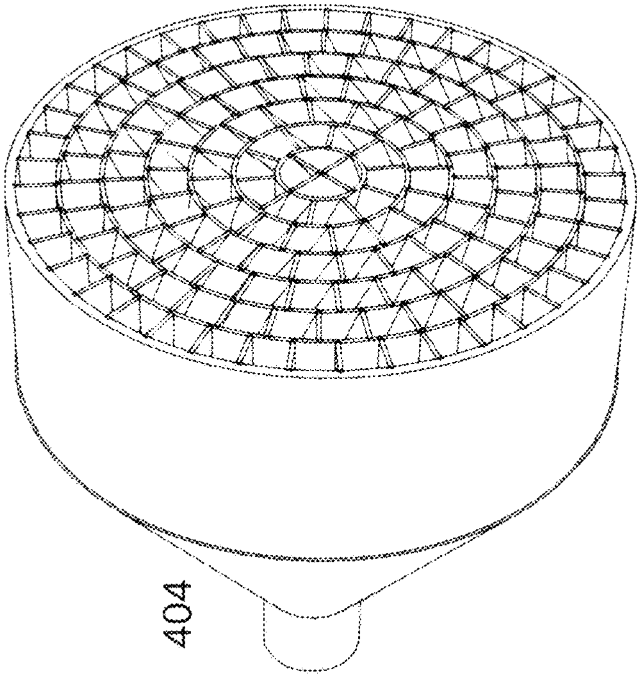
Rendering of a helical lens matched to a linear horn
*FIG 4.* Horn with matched Lens

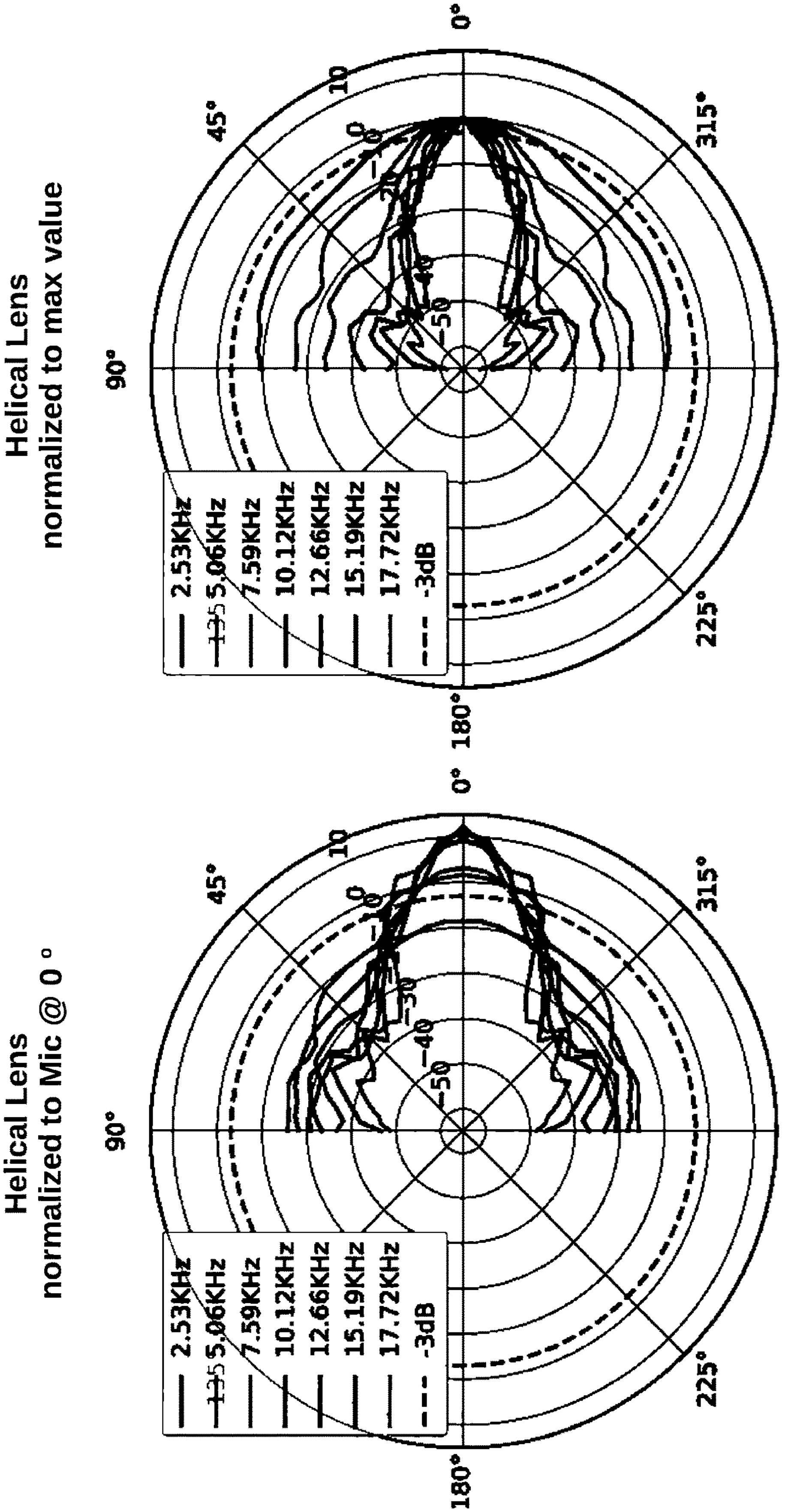
*FIG 5.* Lens Pattern

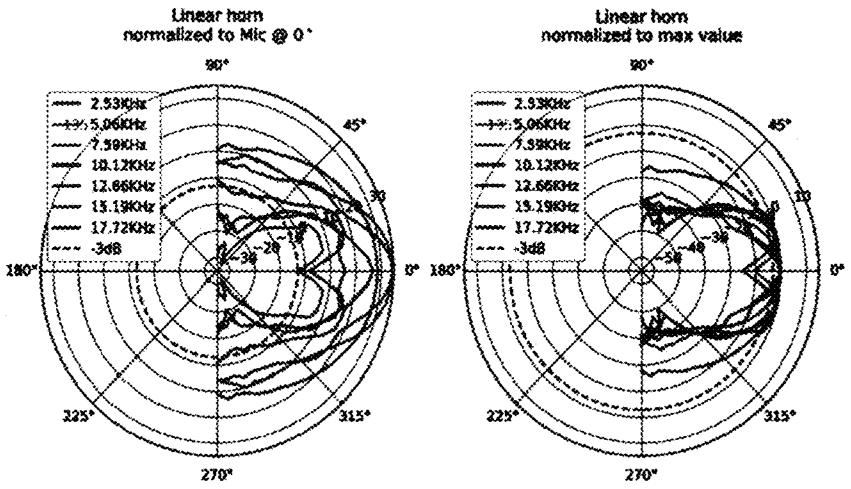
FIG. 6 Horn Pattern
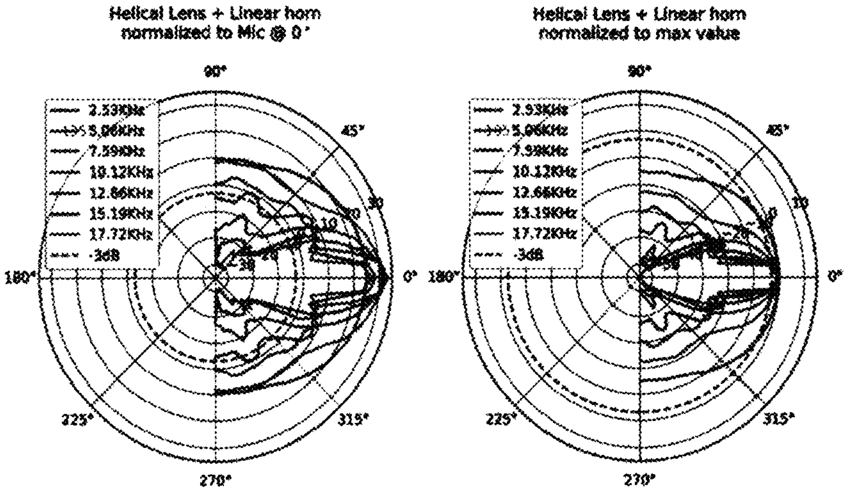
FIG. 7 Lens+Horn Pattern

HELICAL ACOUSTIC LENS

RELATED APPLICATIONS

This application is a non-provisional of and claims the benefit of the filing date of U.S. Provisional Patent Application No. 63/105,351 filed 25 Oct. 2020. The entire disclosure of which is herein incorporated by reference.

FILED OF TECHNOLOGY

The present invention is related, but not limited to meta-material acoustic lens.

The present invention is especially useful in conjunction with an acoustic horn.

Examples include but not limited to directional sound transducers, whereas said transducer can be a detector (microphone), an emitter (loud speaker) or both (sonar, ultrasound).

BACKGROUND

Sound transducers convert energy from acoustic sound pressure to a different form of energy, usually to changes in current of voltage and vice versa.

Directionality of the sound transducer pattern can be obtained in various ways including (i) reflectors, (ii) horns, (iii) arrays and (iv) acoustic lenses.

Meta-materials lenses are lenses that gain certain parts of their functionality through structure rather than the properties of the underlying material. Meta-materials used to manipulate electromagnetic waves as well as acoustic waves are often comprised of a repeated pattern of elements such as resonators or phase-shifters.

An example of a meta-material acoustic lens is obtained by dividing the lens surface into a grid and placing harmonic channels acting as waveguides of different lengths at different grid locations, manipulating of the waves that pass through the lens, thus controlling the wavefront.

However, this arrangement does not fully utilize the area of the lens and has a different pitch between the primary axes and the diagonals.

OBJECTS

It is an object of this invention to:

1. Present a novel acoustic lens where the channels follow a helical path, which better utilizes the area of the lens and is radially symmetric.
2. Show improved performance of acoustic horns when combined with the helical lens.

BRIEF DESCRIPTION OF THE DRAWINGS

For a more complete understanding of the invention, reference is made to the following description and accompanying drawings, in which;

FIG. 1 Helical lens design notation (showing a cross section cut of the lens);

FIG. 2 Helical lens image and CAD rendering;

FIG. 3 Rendering of a single layer of a mirrored helical lens;

FIG. 4 Helical lens matched to exponential and linear horn;

FIG. 5 Helical lens pattern at different frequencies;

FIG. 6 Linear horn pattern at different frequencies; and

FIG. 7 helical Lens matched to a Linear horn pattern at different frequencies.

DETAILED DESCRIPTION

Similar to the operating concept guiding the design of an optical lens, the methodology is to delay the signals by adapting the effective path lengths of the wavefront through the lens. The purpose is to equate all paths traveling between the designated source and target. The design described here is based on the assumption of a plane wave arriving from infinity, but as with an optical lens, this can be adapted to any target. Unlike optics, dispersion in airborne acoustics is very low, allowing for a significant bandwidth, much wider than an acoustic horn, as there is no throat or mouth constraining the boundaries of the frequency range.

Travel time delays are achieved using a layered construction, with each layer consisting of helically rotating channels, as depicted in FIG. 2, showing a picture of an actual lens (201), a CAD rendering of the same lens (202), and a CAD rendering of a single layer of the lense (203).

Based on the notation presented in FIG. 1. Plane wave (101) enters the lens (102) at the entry ports (104), passes through the lens exiting at the exit ports (105), to be focused at the focal point (103). We denote the total path length through the lens at distance $r_i$ from the center (layer i) by $$l(r_i) = h(r_i) + d(r_i).$$

To focus a plane wave (point source at infinity) we will equalize $l(r_i)$ for all i.

We also consider the combination of the described acoustic lens and an acoustic horn, which allows for improved bandwidth and directionality of both horn and lens.

As previously mentioned, we aim to equate $l(r_i)$ for all i. As $d(r_i)$ is a given, what can be modified by the lens is the path through the lens, $h(r_i)$. To this end, as a first step, we construct a layered lens with a helical structure. A single such structure (203) is presented in FIG. 2.

The path length of the helix acoustic channel $$h(r, \alpha) = \begin{Bmatrix} r\cos\left(\frac{\pi\alpha t}{180}\right) \\ r\sin\left(\frac{\pi\alpha t}{180}\right) \\ Ht \end{Bmatrix}, t \in [0, H]$$

at a (mean) distance r from the center and given angle rotation range α (given in degrees), is given by $$\begin{aligned} lh &= \int_0^1 h\,ds \\ &= \int_0^1 \left|\frac{\partial h}{\partial t}\right| dt \\ &= \int_0^1 \sqrt{H^2 + \frac{\pi^2 a^2 r^2 \sin^2\left(\frac{\pi a t}{180}\right)}{180^2} + \frac{\pi^2 a^2 r^2 \cos^2\left(\frac{\pi a t}{180}\right)}{180^2}}\, dt \\ &= \frac{\sqrt{180^2 H^2 + \pi^2 a^2 r^2}}{180} \end{aligned}$$

where:

r helix radius

H lens thickness

α angle range through which the helix traverses

The pitch p(α) of each helix as a function of α, measured in revolutions per lens thickness H, is given by p(α)=α/360°

Next, we solve for the helix angle range α(r) at distance r from the center to compensate for the path length variation to get the wavefront to converge at the focal point f To this end, we need to increase the travel distance through the lens going inward from the outside to compensate for the shorter travel distance to the focal point.

Thus, the maximum travel distance from the edge of the lens to the focal point is: $R^2+f^2$ The required compensation distance is: $R^2+f^2-f^2+r^2$.

$$-H+\frac{\sqrt{180^2 H^2+\pi^2\alpha^2 r^2}}{180}$$

The compensation distance through the lens as a function of α is:

which means that we want to solve the following for α:

$$-H+\frac{\sqrt{180^2 H^2+\pi^2\alpha^2 r^2}}{180}=\sqrt{R^2+f^2}-\sqrt{f^2+r^2}$$

yielding $$\alpha(r)=\frac{180\sqrt{-H^2+\left(H+\sqrt{R^2+f^2}-\sqrt{f^2+r^2}\right)^2}}{\pi r}$$

The standard helical lens design described above suffers from the limitation that beams arriving off-center are translated out of reference with respect to each other through the lens. This is due to beams arriving at different distances from the center being rotated a different distance around the center axis with respect to each other. The results are that while beams focus correctly at the center, the lens does not create an "image" for off-center sources.

To compensate, we cut the lens into slices alternating between the left-hand and right-hand rotations. This corrects for the relative offset and creates a proper image at the imaging plane.

The simplest case is a two-slice lens (301) consisting of a right hand (clockwise) and a left hand (counter-clockwise) halves. This setup is shown in FIG. 3.

The setup can be extended to an arbitrary number of slices, possibly using smooth transitions between slices. One such example is to use pseudo-helical sinusoidal channels.

The acoustic lens is more limited at lower frequencies due to face size and does not match impedance at the microphone or speaker. Acoustic horns are designed for impedance matching. While achieving focusing as well, their focusing ability is limited. The lower cutoff frequency (high pass filter) is controlled by the mouth (free air port) aperture size, and horn flare angle. The high cutoff (generally a mix between a low pass and a notch filter), is controlled by the throat (microphone or speaker port) aperture size. Their bandwidth is generally limited, with potentially complex beaming patterns at higher frequencies. A linear horn for example presents a bimodal (more accurately, donut-shaped) focusing distribution, as shown in FIG. 6.

Towards the goal of properly loading the microphone or speaker, improving the lens lower frequency response and the horn's higher frequency response, we can combine a horn with a helical lens with a focal length matched to the horn length.

FIG. 4 shows two examples, a combination of helical lens (401) and an exponential horn (402) and a combination of helical lens (403) and linear horn (404).

FIG. 5, through FIG. 7 show a comparative analysis of the lens response compared to the horn response, and horn plus lens response. Here, (FIG. 5) shows the system response for the helical lens, (FIG. 6) for a linear horn, and (FIG. 7) shows the joint response of the linear horn and lens. As is demonstrated, the joint response improves frequency response, gain, focusing, and bandwidth.

As can be seen, the helical lens has a beamwidth of about ⅓ the beamwidth of the linear lens. The linear lens is showing a bimodal distribution, while the helical lens is a unimodal distribution. The lens achieves a 12 dB gain at higher frequencies, while the horn achieves over 30 dB at lower frequencies. On the other hand, when combining a lens and a horn, we see a beamwidth of roughly ½ that of just the lens. Gain is higher than either alone, achieving over 30 dB from the lower end of the horn, and maintaining over 25 dB up to the higher end of the lens.

CONCLUSION

We have shown a design for a meta-material acoustic lens based on helical channels with pitch that changes as a function of the helix radius.

Experimental results have shown that effective focusing is achieved at the audible range.

We have also shown that mating an acoustic meta-material lens to an acoustic horn can significantly increase the effective range of the mated setup with high directionality over a wide bandwidth.

Our design can be used for sound sensing (microphones) sound synthesis (loudspeakers), or both (sonar, ultrasound heads), potentially also in a medium other than air.

What is claimed:

1. An acoustic lens comprising of one or more slices wherein:

a) each slice comprises of one or more radial layers b) each layer comprises a plurality of radially arranged helical channels, c) each channel at each layer has an entrance port and a exit port, d) the helix pitch p of each helical channel is a function of the radius of the layer for the helical channel, e) if the number of slices N is larger than one then the exit port of each channel at slice I, 1≤I≤N−1 connects to the entrance port of a matched channel at slice I+1.

2. The acoustic lens of claim 1, where the pitch p(r) is given by p(r)=α(r)/360°, $$\alpha(r)=\frac{180\sqrt{-H^2+\left(H+\sqrt{R^2+f^2}-\sqrt{f^2+r^2}\right)^2}}{\pi r},$$

where H is the thickness of the lens, f is the focal length of the lens, R is radius of the lens, and r is the radius of the helical channel.

3. The acoustic lens of claim 1 where the number of slices is greater than one, at least the helixes of one slice are rotated clockwise, at least the helixes of one slice are rotated counter clockwise, and the sum complete helical turns of each channel through all slices of the lens is a whole number.

4. The acoustic lens of claim 1 where the lens is attached to the mouth side of an acoustic horn.

5. The acoustic lens and horn of claim 4 where the focal length of the acoustic lens is f, $0.5\ s<f<2\ s$, where s is the length of the acoustic horn.

* * * * *